(12) United States Patent
Kesler

(10) Patent No.: US 11,754,204 B2
(45) Date of Patent: Sep. 12, 2023

(54) STABILIZED H-PLATE

(71) Applicant: Hanon Systems, Daejeon (KR)

(72) Inventor: Eric Kesler, Northville, MI (US)

(73) Assignee: HANON SYSTEMS, Daejeon (KR)

( * ) Notice: Subject to any disclaimer, the term of this patent is extended or adjusted under 35 U.S.C. 154(b) by 401 days.

(21) Appl. No.: 16/939,153

(22) Filed: Jul. 27, 2020

(65) Prior Publication Data

US 2022/0025993 A1    Jan. 27, 2022

(51) Int. Cl.
*F16L 3/22* (2006.01)
*F25B 41/31* (2021.01)
*F25B 41/40* (2021.01)

(52) U.S. Cl.
CPC .............. *F16L 3/222* (2013.01); *F25B 41/31* (2021.01); *F25B 41/40* (2021.01)

(58) Field of Classification Search
CPC ......... F16L 3/222; F16L 41/086; F25B 41/31; F25B 41/40; F25B 41/003; F25B 41/062
See application file for complete search history.

(56) References Cited

U.S. PATENT DOCUMENTS

| 4,468,054 | A |   | 8/1984 | Orth |  |
|---|---|---|---|---|---|
| 4,589,265 | A | * | 5/1986 | Nozawa | F25B 39/024 62/526 |
| 5,467,611 | A | * | 11/1995 | Cummings | F16L 41/086 251/151 |
| 7,971,910 | B2 | * | 7/2011 | Holt | F16L 41/086 285/13 |
| 8,468,849 | B2 |  | 6/2013 | Kesler et al. |  |
| 9,114,687 | B2 |  | 8/2015 | Dorland et al. |  |
| 9,556,993 | B2 |  | 1/2017 | Kesler et al. |  |
| 2010/0237615 | A1 |  | 9/2010 | Cho et al. |  |
| 2011/0083466 | A1 |  | 4/2011 | Lim et al. |  |
| 2011/0210545 | A1 | * | 9/2011 | Kesler | F16L 41/086 285/336 |
| 2011/0214755 | A1 | * | 9/2011 | Kesler | B60H 1/00571 137/468 |

(Continued)

FOREIGN PATENT DOCUMENTS

| EP | 3252401 | A1 |   | 12/2017 |  |
|---|---|---|---|---|---|
| GB | 2508261 | A | * | 5/2014 | B23P 11/00 |

(Continued)

*Primary Examiner* — Terrell L McKinnon
*Assistant Examiner* — Ding Y Tan
(74) *Attorney, Agent, or Firm* — Shumaker, Loop & Kendrick, LLP; James D. Miller

(57) ABSTRACT

An end plate for an expansion valve of a refrigeration circuit. The end plate includes a pair of slots or apertures, each of the slots configured to receive a tube or hose therein. Further, a pair of apertures is formed in the end plate extending from a first surface to a second surface thereof, each of the apertures configured to receive a fastener therein. The first face of the end plate includes a pair of protuberances extending outwardly from the first face. The protuberances are formed adjacent and laterally outwardly from the pair of apertures. The protuberances act as spacers and abut a surface of a housing of the expansion valve and may create a gap between the housing and the end plate to ensure equal clamping loading and militate against damage to a seal element between the housing and the end plate due to misalignment.

18 Claims, 3 Drawing Sheets

(56) References Cited

U.S. PATENT DOCUMENTS

| | | | |
|---|---|---|---|
| 2012/0091708 A1* | 4/2012 | Schroeder | F16L 41/086 |
| | | | 285/374 |
| 2014/0062079 A1* | 3/2014 | Kesler | B60H 1/00571 |
| | | | 29/525.02 |
| 2014/0265307 A1 | 9/2014 | Dorland et al. | |
| 2015/0233514 A1* | 8/2015 | Kesler | F16L 41/06 |
| | | | 285/208 |
| 2016/0282025 A1 | 9/2016 | Moreau et al. | |
| 2017/0059064 A1* | 3/2017 | Thrift | F16L 23/028 |
| 2017/0176067 A1 | 6/2017 | Satake et al. | |
| 2018/0023835 A1 | 1/2018 | Ooura et al. | |
| 2018/0229582 A1 | 8/2018 | Mazzocco et al. | |
| 2019/0048791 A1 | 2/2019 | Rankenberg et al. | |
| 2020/0031192 A1 | 1/2020 | Cha et al. | |

FOREIGN PATENT DOCUMENTS

| | | | | |
|---|---|---|---|---|
| JP | 2006275254 A | * | 10/2006 | F16L 39/00 |
| JP | 6418328 B2 | | 11/2018 | |
| KR | 20130019149 | * | 3/2013 | |
| KR | 20140027765 A | * | 3/2014 | |
| KR | 1020130019149 A | | 6/2014 | |
| KR | 1020200017783 A | | 2/2020 | |
| WO | 2017145619 A1 | | 8/2017 | |
| WO | 2018116628 A1 | | 6/2018 | |
| WO | 2018168590 A1 | | 9/2018 | |
| WO | 2018179258 A1 | | 10/2018 | |
| WO | 2019012810 A1 | | 1/2019 | |
| WO | 2019047720 A1 | | 3/2019 | |
| WO | 2019105336 A1 | | 6/2019 | |

* cited by examiner

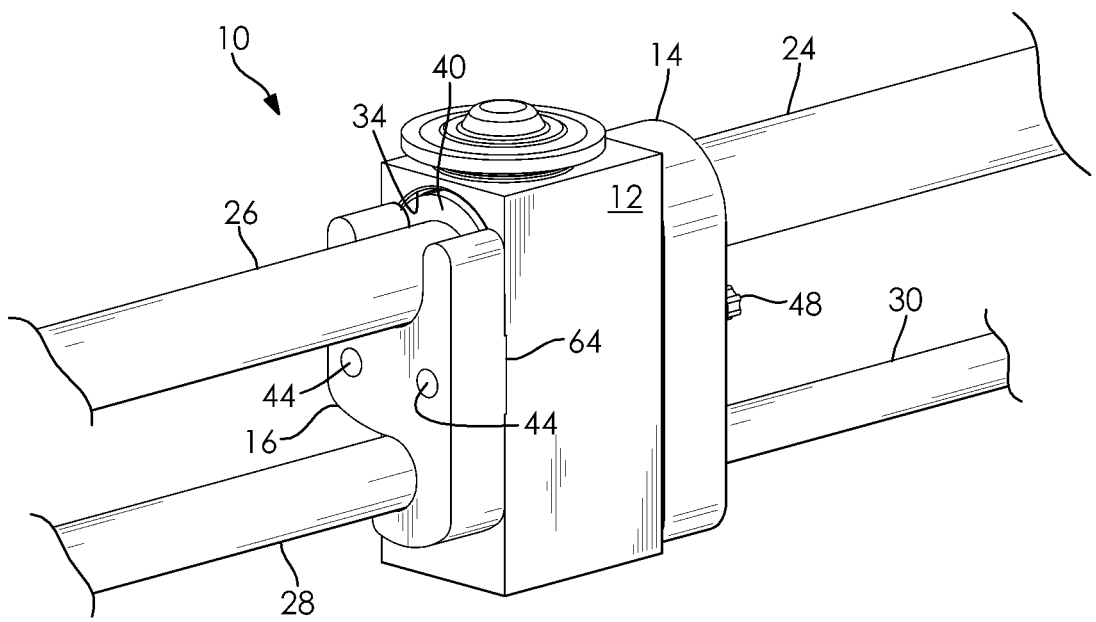
FIG. 1
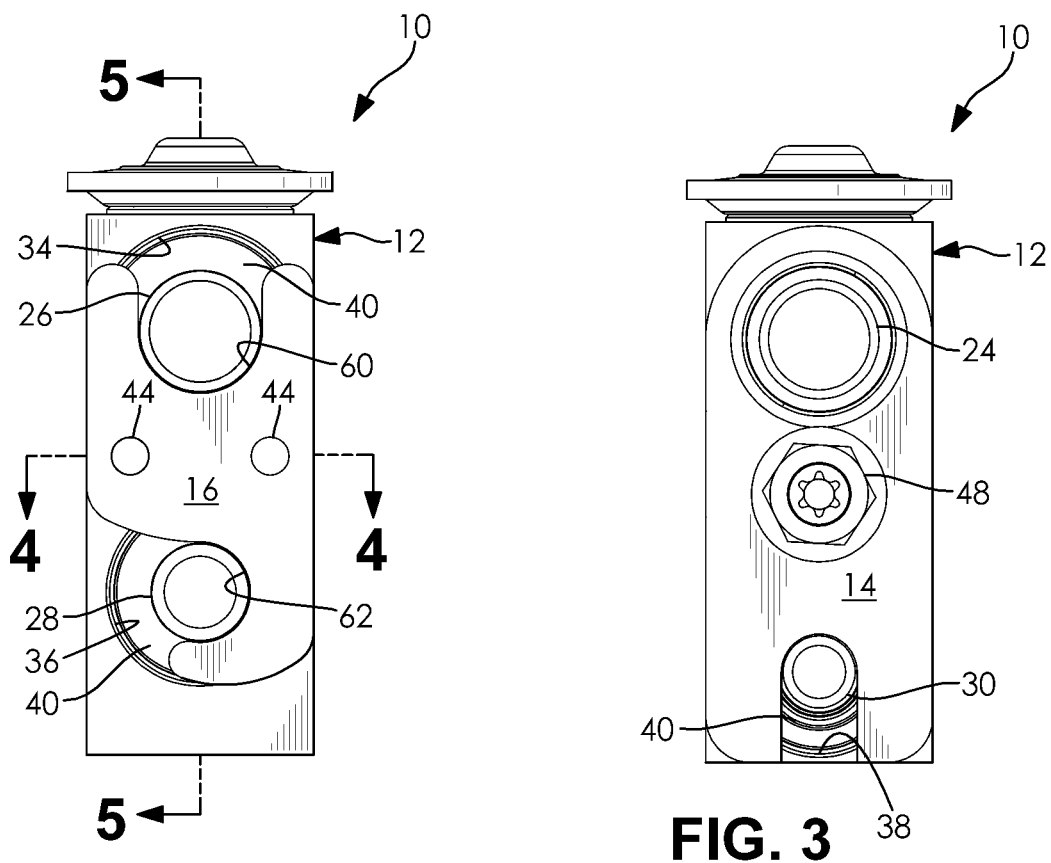
FIG. 2
FIG. 3

STABILIZED H-PLATE

FIELD OF THE INVENTION

The invention relates generally to an expansion valve, and more particularly to an end plate of an expansion valve suitable for use in a refrigeration circuit.

BACKGROUND

A refrigeration circuit in an automotive air conditioner generally includes a compressor for compressing a circulating refrigerant, a condenser for condensing the compressed refrigerant, an expansion valve for throttling and expanding the condensed refrigerant, and an evaporator for cooling the air in a vehicle interior using evaporative latent heat of the refrigerant. The expansion valve controls the flow rate of the refrigerant delivered toward the evaporator so that the refrigerant having passed through the evaporator has a predetermined degree of superheat.

It is common practice to link the evaporator to an expansion valve via a coupling device which is generally formed by a metal block. The expansion valve typically comprises fluid inlet and outlet ports intended to be linked by internal passages of the coupling device respectively to outlet and inlet ports of the evaporator. The axes of the inlet and outlet ports of the expansion valve are parallel and extend in a plane passing substantially through a housing of the expansion valve. Sealing elements such as O-rings, metal seals, gaskets, and the like are often used to seal evaporator lines to the housing of the expansion valve. An h-plate is often secured to a side of the housing of the expansion valve to urge the sealing elements against the housing of the expansion valve. The expansion valve, as well as other multi-port devices in the air conditioning system such as a condenser manifold and an in-line tube manifold, typically uses a double fitting incorporating the sealing elements. An example of an expansion valve is disclosed in commonly owned U.S. Pat. No. 8,468,849, hereby incorporated herein by reference in its entirety.

In certain automotive refrigerant components using metal seal gaskets for dual port components, two or more fasteners may be used for assembly. Examples of such are an electric expansion valve (EXV), a thermal expansion valve (TXV) or other components. It is desirable to use a "dual spindle" torque tool where two or more fasteners are used for assembly so the two fasteners are tightened in a "balanced" fashion with a similar clamp load applied to all portions of the sealing elements. For example, dual spindle torque tools are used for assembling a TXV to an evaporator core. However, the dual spindle torque tool is not always available and the fasteners may be driven one at a time. As a result, an imbalance in the fitting and the seal connection which can result in premature failure and leakage.

There is a continuing need for an h-plate/end plate connection to an expansion valve which militates against an imbalance of clamp loads and seal joint degradation.

SUMMARY

Consistent and consonant with the instant disclosure, an expansion valve militates against an imbalance of clamp loads and seal joint degradation has surprisingly been discovered.

According to an embodiment of the present invention, an end plate of a fluid handling system is disclosed. The end plate comprises a plate having a first tube aperture and a second tube aperture formed therein. Each of the first tube aperture and the second tube aperture are configured to receive a tube therein. The first tube aperture is formed at a first end of the plate and the second tube aperture is formed at a second end of the plate. A first protuberance is formed on a first surface of the plate and a second protuberance is formed on the first surface of the plate. The first protuberance and the second protuberance are positioned intermediate the first tube aperture and the second tube aperture.

According to an embodiment of the present invention, a fluid handling assembly is disclosed. The fluid handling assembly comprises a housing configured to convey a fluid therethrough in a plurality of apertures formed therein. An end plate has a first tube aperture and a second tube aperture formed therein. Each of the first tube aperture and the second tube aperture configured to receive a tube therein. The tube is in fluid communication with one of the plurality of apertures formed in the housing. The first tube aperture is formed at a first end of the end plate and the second tube aperture formed at a second end of the end plate. A first protuberance is formed on a first surface of the end plate, the first protuberance disposed intermediate the housing and the end plate.

According to yet another embodiment of the present invention, an expansion valve assembly is disclosed. The expansion valve assembly comprises a housing configured to convey a fluid therethrough in a plurality of apertures formed therein. A first end plate is coupled to the housing having a first aperture and a second aperture formed therein. Each of the first aperture and the second aperture configured to receive a tube therein. A second end plate is coupled to the housing having a first tube aperture and a second tube aperture formed therein. Each of the first tube aperture and the second tube aperture is configured to receive a tube therein. The first tube aperture formed at a first end of the second end plate and the second tube aperture formed at a second end of the second end plate. A first protuberance is formed on a first surface of the second end plate and a second protuberance is formed on the first surface of the second end plate. The first protuberance and the second protuberance are disposed intermediate the housing and the second end plate.

BRIEF DESCRIPTION OF THE DRAWINGS

The above and other features and advantages of the present disclosure will be more clearly understood from the following detailed description taken in conjunction with the accompanying drawings, in which:

FIG. 1 is a fragmentary top perspective view of an expansion valve assembly according to an embodiment of the disclosure;

FIG. 2 is a first end elevational view of the expansion valve assembly of FIG. 1;

FIG. 3 is a second end elevational view of the expansion valve assembly of FIG. 1;

DETAILED DESCRIPTION OF THE INVENTION

Figure 4:
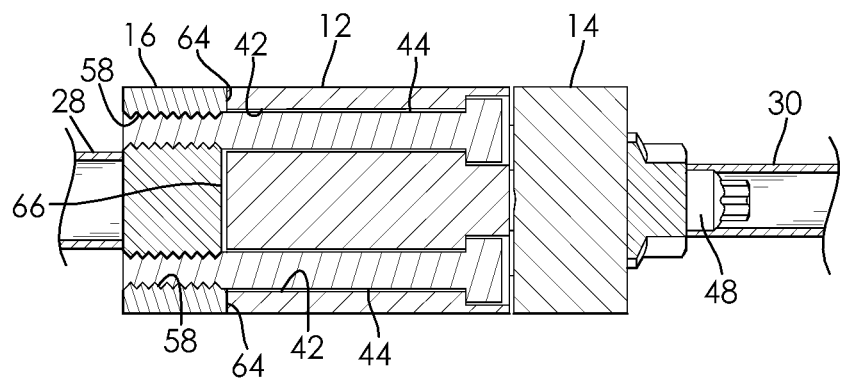
FIG. 4 is a fragmentary cross-sectional view of the expansion valve assembly taken along line 4-4 of FIG. 2.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "substantially" means approximate to or almost.

FIGS. 1-5 show a fluid handling assembly or an expansion valve assembly 10 according to an embodiment of the disclosure. In the embodiment shown, the expansion valve 10 is a thermal expansion valve (TXV). However, it is understood the expansion valve 10 can be other expansion valves such as an electric expansion valve (EXV) or other components, for example. The expansion valve assembly 10 may be in fluid communication with an evaporator of a refrigeration circuit in an automotive air conditioner. Further, the expansion valve assembly 10 can be in fluid communication with a heat exchanger, a battery chiller, and other components such as air conditioning components, heating components, and cooling components. The expansion valve assembly 10 typically includes a housing 12, a first end plate 14, and a second end plate 16. It is understood that the first end plate 14 may be eliminated in some expansion valve assemblies and replaced by certain block fittings and peanut fittings, for example.

In the embodiment shown, the housing 12 is produced from a metal. However, it is understood that other materials can be used as desired. The housing 12 includes a first aperture 18, a second aperture 20, and a third aperture 22 formed therein. Each of the apertures 18, 20, 22 is substantially cylindrical in shape and a longitudinal axis of each of the apertures 18, 20, 22 is parallel with one another. The first aperture 18 is configured to receive an end of a first tube or conduit 24 and an end of a second tube or conduit 26 therein. The second aperture 20 is configured to receive an end of a third tube or conduit 28 therein, and the third aperture 22 is configured to receive a fourth tube or conduit 30 therein. Each of the tubes 24, 26, 28, 30 can be formed from any conventional material such as a metal, a plastic, or other suitable material, for example.

Figure 5:
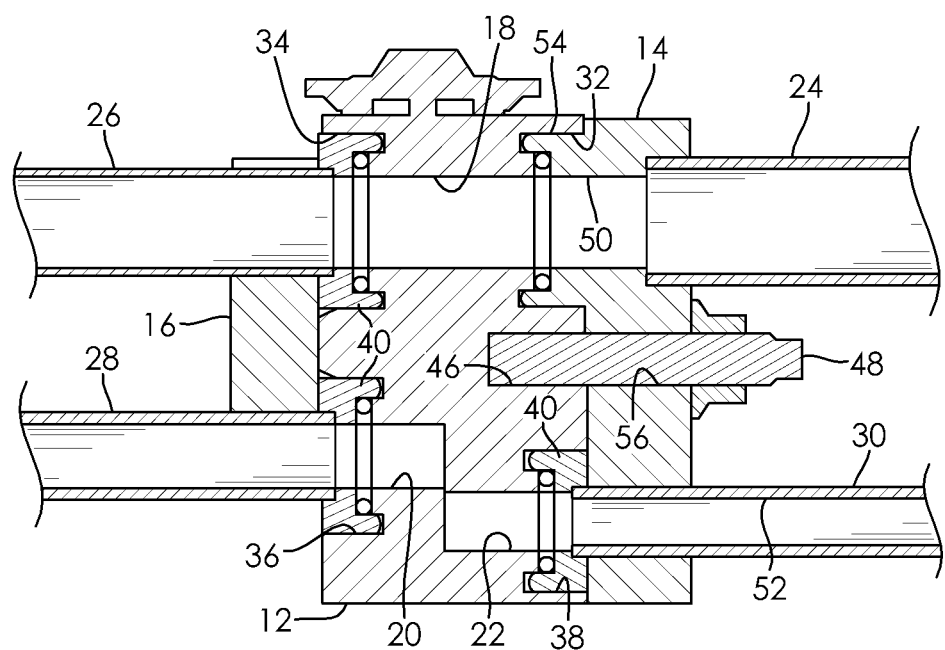
FIG. 5 is a fragmentary cross-sectional view of the expansion valve assembly taken along line 5-5 of FIG. 2.
Figure 6:
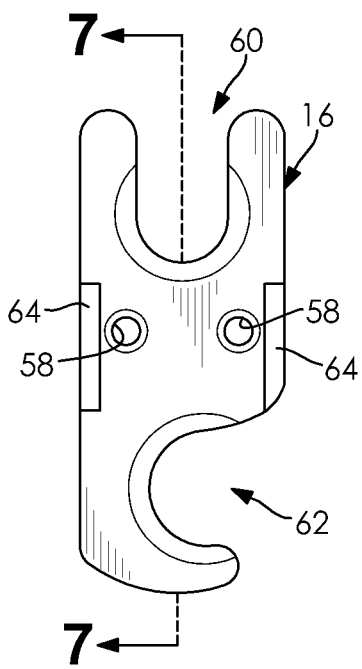
FIG. 6 is rear elevational view of an end plate of the expansion valve assembly of FIG. 1.
Figure 7:
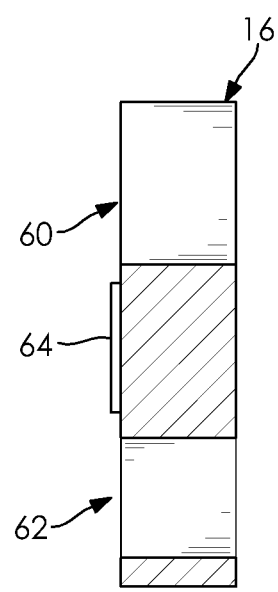
FIG. 7 is a cross-sectional view of the end plate taken along line 7-7 of FIG. 6.

As shown in FIG. 5, a first port 32 having a diameter larger than a diameter of the first aperture 18 is formed at a first end of the first aperture 18. A second port 34 having a diameter larger than the diameter of the first aperture 18 is formed at a second end of the first aperture 18. A third port 36 having a diameter larger than a diameter of the second aperture 20 is formed at an end of the second aperture 20. A fourth port 38 having a diameter larger than a diameter of the third aperture 22 is formed at an end of the third aperture 22. Each of the second port 34, the third port 36, and the fourth port 38 is configured to receive a collar 40 therein. In the embodiment shown, the collar 40 is produced from a metal although it is understood other materials can be used as desired. Each of the collars 40 is configured to receive a respective one of the tubes 26, 28, 30 in a central aperture of the collars 40. The tubes 26, 28, 30 are received in the collars 40 in a leak proof manner and may be coupled to the collars 40 in any conventional manner such as a friction fit, brazing, welding, and the like for example. Further, an end of the tubes 26, 28, 30 can include a flare or a flange on an end thereof to cooperate with the collars 40 to be fixedly held within the ports 34, 36, 38.

A pair of fastener apertures 42 is formed in the housing 12 with an axis of the fastener apertures 42 substantially parallel with the axes of the apertures 18, 20, 22. Each of the fastener apertures 42 is configured to receive a fastener 44 therein. As shown, the fasteners 44 are bolts. However, it is understood other conventional fasteners can be used. The fastener apertures 42 in the housing 12 may include recesses that receive heads of the fasteners 44, and permits the first end plate 14 to be disposed thereover without contacting the heads of the fasteners 44. It is understood more fasteners 44 can be used if desired.

A threaded aperture 46 is formed in the housing 12 with an axis of the threaded aperture 46 substantially parallel with the axes of the apertures 18, 20, 22. The threaded aperture 46 is configured to receive a threaded fastener 48 therein although other conventional fasteners may also be used. It should be understood that the housing 12 of the present disclosure may include additional ports and corresponding additional tubes, additional collars, and the like. The additional ports, collars, and tubes may share all or a portion of the structure described hereinabove. The additional tubes, collars, and seal structures cooperating with the additional ports may also have the same or different dimensions, as desired. Further information on the additional seal structures is disclosed in commonly owned U.S. Pat. No. 8,468,849, incorporated herein by reference.

A first aperture 50 and a second aperture 52 are formed in the first end plate 14 and extend from a first surface to a second surface thereof. Each of the apertures 50, 52 is substantially cylindrical in shape and a longitudinal axis of each of the apertures 50, 52 is parallel with one another and substantially parallel with the axes of the apertures 18, 20, 22. The first aperture 50 is configured to receive an end of the first tube 24 therein. The second aperture 52 is configured to receive an end of the fourth tube 30 therein. The first end plate 14 further includes a collar 54 surrounding the first aperture 50 and extending outwardly from the second side of the first end plate 14. The collar 54 is configured to be received in the first port 32 of the housing 12. In the embodiment shown, the collar 54 and the first end plate 14 are produced from a metal, although it is understood other materials can be used as desired. The first tube 24 is received in the collar 54 in a leak proof manner and may be coupled to the collar 54 in any conventional manner such as a friction fit, brazing, welding, and the like for example. Further, an end of the first tube 24 can include a flare or a flange on an end thereof to cooperate with the collar 54 to be fixedly held within the first port 32. A fastener aperture 56 is formed in the first end plate 14 with an axis of the fastener aperture 56 substantially parallel with the axes of the apertures 18, 20, 22. The threaded fastener 48 extends through the fastener aperture 56 to be received in the threaded aperture 46. The second surface of the first end plate 14 is configured to abut the collar 40, thereby securing the collar 40 and the fourth tube 30 to the housing 12.

The second end plate 16 is a plate-like structure. In the embodiment shown, the second end plate 16 is an h-type plate and is produced from a metal. However, it is understood other plate types and configurations can be used and other materials having desired properties can be used without departing from the scope of the invention. The second end plate 16 is substantially planar and a first surface thereof abuts a wall of the housing 12 on a side of the housing 12 opposite the first end plate 14. A pair of threaded apertures 58 is formed through the second end plate 16 with an axis of the threaded apertures 58 substantially parallel with the axes of the apertures 18, 20, 22. Each of the threaded apertures 58 is configured to threadingly engage with threads of one of the fasteners 44. The threaded engagement of the threaded apertures 58 and the fasteners 44 urges the second end plate 16 into abutment with the housing 12. It is understood that more or fewer or the threaded apertures 58 can be used in conjunction with more or fewer of the fasteners 44 if desired. It is further understood that the threaded apertures 58 can be non-threaded apertures allowing the fasteners 44 to extend therethrough and engage with a nut to secure the second end plate 16 to the housing 12.

Figure 8:
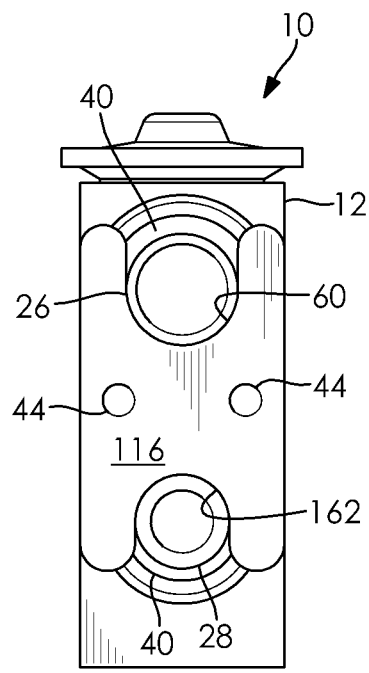
FIG. 8 is a first end elevational view of the expansion valve assembly including an end plate according to another embodiment of the disclosure.
Figure 9:
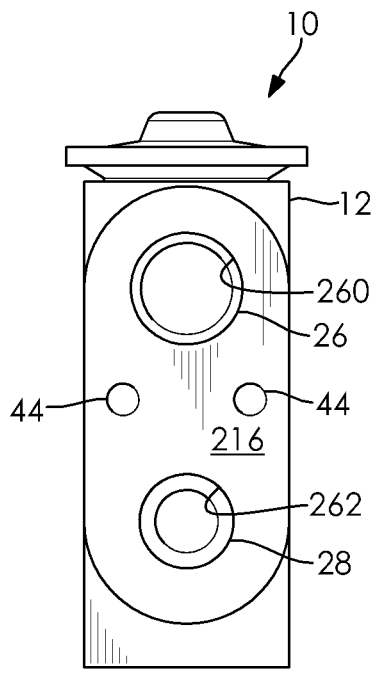
FIG. 9 is a first end elevational view of the expansion valve assembly including an end plate according to another embodiment of the disclosure.

The second end plate 16 further includes a first tube aperture 60 formed in a first end of the second end plate 16 for receiving the second tube 26. A second tube aperture 62 is formed in a second end of the second end plate 16. The first tube aperture 60 and the second tube aperture 62 may be in the form of a slot, a substantially cylindrical hole, or have other shapes and configurations as desired. A skilled artisan may select alternative configurations for the second end plate 16, as desired. FIGS. 8 and 9 show examples of other embodiments of the second end plate 16 including a first tube aperture 160, 260 and a second tube aperture 162, 262. A remainder of the structure of the expansion valve assembly 10 remains unchanged from the description herein with reference to the remaining figures and includes the same reference numerals for repeated structure.

In the embodiment shown, the first surface of the second end plate 16 includes a pair of protuberances 64. The protuberances 64 can be in the form of embossments, raised portions, heels, and the like, for example. Further, the protuberances 64 can be formed as a unitary structure with the second end plate 16 or be formed separately therefrom and joined thereto by any conventional joining method such as by an adhesive, welding, heat welding, brazing, and the like, for example. The protuberances 64 may also be produced from the same material as the second end plate 16 or from a material different from the second end plate 16. The protuberances 64 are formed adjacent the threaded apertures 58. As shown, the protuberances 64 are formed laterally outwardly from the threaded apertures 58 between the threaded apertures 58 and an edge of the second end plate 16 and have a substantially rectangular shape. However, it is understood the protuberances 64 can be located elsewhere on the first surface such as between the threaded apertures 58 or surrounding the threaded apertures 58, for example. Further, the protuberances 64 can have any other shape such as square, circular, oval, irregular, and the like, for example. It is also understood the protuberances 64 can be formed in similar locations on the housing 12 without departing from the scope of the invention.

During assembly of the expansion valve assembly 10, it is desirable to use a dual spindle type torque tool so the fasteners 44 are tightened in a balanced fashion with a similar clamp load applied to all portions of sealing elements and the collars 40. However, the dual spindle type torque tool is not always available and the fasteners 44 must then be driven one at a time. In the prior art, this created an imbalance in the expansion valve assembly 10 and the seal connections which can result in premature failure and leakage. The imbalance resulted from a first one of the fasteners 44 being fully tightened until one side of the second end plate 16 abutted the housing 12, thus resulting in the formation of a large gap between an opposite side of the second end plate 16 and the housing 12. Thus, when a second one of the fasteners 44 is tightened, a gap remains between the opposite side of the second end plate 16 and the housing 12 and the imbalance in the expansion valve assembly 10 results.

If a single one of the fasteners 44 is tightened using the second end plate 16 of the current disclosure, one of the protuberances 64 on the side of the second end plate 16 where the one of the fasteners 44 is being tightened is caused to contact the housing 12 first, thereby preventing the first surface of the second end plate 16 from being brought into contact with the housing 12. Thus, when a second one of the fasteners 44 is tightened on the opposite side of the second end plate 16, the other of the protuberances 64 is caused to contact the housing 12, thus avoiding the gap and imbalance caused by the second end plate of the prior art. In the embodiment shown, a small gap 66 remains between the second end plate 16 and the housing 12, but the expansion valve assembly 10 and the seal connections are in balance as forces are applied equally by the second end plate 16. Further, a seal gasket (not shown) can be provided in the gap 66 and/or surrounding areas between the first surface of the second end plate 16 and the housing 12 if desired. A height of the protuberances 64 from the first surface of the second end plate 16 can be tuned to minimize a tipping of the second end plate 16 during installation thereof and also allow proper clamp forces to be applied to the collars 40 resulting in proper sealing of the expansion valve assembly 10. Depending upon the tuning of the height of the protuberances 64, the gap 66 may or may not remain between the second end plate 16 and the housing 12. Further dependent upon the tuning, a small gap may also be present between the protuberances 64 and the housing 12. In the embodiment shown, favorable results have been obtained using M5 bolts as the fasteners 44 with the height of the protuberances 64 ranging from 0.1 mm to 1.5 mm, a length of the protuberances 64 taken vertically in a direction parallel to the edge of the second end plate 16 in a range of approximately 1 to 10 times an outside diameter of the fasteners 44, and a width of the protuberances 64 taken horizontally transverse to the length of the second end plate 16 in a range of approximately 20% to 200% of the outer diameter of the fasteners 44. Further, favorable results have been obtained wherein the protuberances 64 are approximately centered on the fasteners 44 in the lengthwise direction.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An end plate of a fluid handling assembly comprising:
   a plate having a first tube aperture and a second tube aperture formed therein, each of the first tube aperture and the second tube aperture configured to receive a tube therein, the first tube aperture formed at a first end of the plate and the second tube aperture formed at a second end of the plate, wherein the plate includes a first edge and a second edge extending between the first end and the second end of the plate;
   a first protuberance formed on a first surface of the plate;
   a second protuberance formed on the first surface of the plate, wherein the first protuberance and the second protuberance are positioned intermediate the first tube aperture and the second tube aperture; and
   a pair of threaded apertures formed in the plate intermediate the first tube aperture and the second tube aperture, and wherein the first protuberance extends along the first edge of the plate adjacent one of the threaded apertures and the second protuberance extends along the second edge of the plate adjacent another one of the threaded apertures.

2. The end plate of claim 1, wherein the first protuberance and the second protuberance are formed as a unitary structure with the plate.

3. The end plate of claim 2, wherein the first protuberance and the second protuberance are formed from a same material as the plate.

4. The end plate of claim 1, wherein the first protuberance and the second protuberance are formed separately from the plate and joined with the plate.

5. The end plate of claim 4, wherein the first protuberance and the second protuberance are formed from a material different from the plate.

6. A fluid handling assembly comprising:
a housing configured to convey a fluid therethrough in a plurality of apertures formed therein, wherein the housing includes an outer face;
an end plate having a first tube aperture and a second tube aperture formed therein, each of the first tube aperture and the second tube aperture configured to receive a tube therein, the tube in fluid communication with one of the plurality of apertures formed in the housing, the first tube aperture formed at a first end of the end plate and the second tube aperture formed at a second end of the end plate;
a first protuberance formed on a first surface of the end plate, the first protuberance disposed intermediate the housing and the end plate; and
a second protuberance formed on the first surface of the end plate intermediate the housing and the end plate, wherein at least one of the first protuberance and the second protuberance abuts the outer face of the housing.

7. The fluid handling assembly of claim 6, wherein the first protuberance and the second protuberance are positioned intermediate the first tube aperture and the second tube aperture.

8. The fluid handling assembly of claim 7, further comprising a pair of fastener apertures formed in the housing and a pair of threaded apertures formed in the end plate, wherein a bolt is received in the pair of fastener apertures and the pair of threaded apertures to couple the end plate to the housing.

9. The fluid handling assembly of claim 6, wherein the housing is configured to be coupled to and in fluid communication with one of a condenser of a refrigeration circuit, a heat exchanger, a battery chiller, and an air conditioning component, a heating component, and a cooling component.

10. An expansion valve assembly comprising:
a housing configured to convey a fluid therethrough in a plurality of apertures formed therein, wherein the housing includes a first outer face and a second outer face;
a first end plate disposed adjacent the first outer face and coupled to the housing, the first end plate having a first aperture and a second aperture formed therein, each of the first aperture and the second aperture configured to receive a tube therein;
a second end plate disposed adjacent the second outer face and coupled to the housing, the second end plate having a first tube aperture and a second tube aperture formed therein, each of the first tube aperture and the second tube aperture configured to receive a tube therein, the first tube aperture formed at a first end of the second end plate and the second tube aperture formed at a second end of the second end plate;
a first protuberance formed on a first surface of the second end plate; and
a second protuberance formed on the first surface of the second end plate, wherein the first protuberance and the second protuberance are disposed intermediate the housing and the second end plate, and wherein at least one of the first protuberance and the second protuberance abuts the second outer face of the housing.

11. The expansion valve assembly of claim 10, wherein the first protuberance and the second protuberance are positioned intermediate the first tube aperture and the second tube aperture.

12. The expansion valve assembly of claim 11, further comprising a pair of fastener apertures formed in the housing wherein a bolt is received in each of the pair of fastener apertures and a pair of threaded apertures to couple the second end plate to the housing.

13. The expansion valve assembly of claim 10, wherein the housing is one of an electric expansion valve and a thermal expansion valve.

14. The expansion valve assembly of claim 10, wherein the second end plate includes a first edge and a second edge extending between the first end and the second end of the second end plate, and the first protuberance is formed adjacent the first edge and the second protuberance is formed adjacent the second edge.

15. The expansion valve assembly of claim 10, wherein the first protuberance and the second protuberance are formed as a unitary structure with the second end plate.

16. The expansion valve assembly of claim 15, wherein the first protuberance and the second protuberance are formed from a same material as the second end plate.

17. The expansion valve assembly of claim 10, wherein the first protuberance and the second protuberance are formed separately from the second end plate and joined with the second end plate.

18. The expansion valve assembly of claim 17, wherein the first protuberance and the second protuberance are formed from a material different from the second end plate.

* * * * *